UNITED STATES PATENT OFFICE.

BERNARD F. DRAKENFELD, JR., OF NEW YORK, N. Y.

GLASS AND METHOD OF MAKING THE SAME.

1,303,268.  Specification of Letters Patent.  Patented May 13, 1919.

No Drawing.  Application filed October 1, 1918. Serial No. 256,373.

*To all whom it may concern:*

Be it known that I, BERNARD F. DRAKENFELD, Jr., a citizen of the United States, residing at 103 East 86th St., New York city, in the county of New York and State of New York, have invented certain new and useful Improvements in Glass and Methods of Making Same, of which the following is a specification.

This invention relates to improvements in the method of manufacturing glass, the object of the invention being to provide an improved method of making glass whereby the strength, temper and appearance of the glass will be materially improved. The improvement however, has more particularly to do with the manufacture of soda, potash or lead glasses in which the principal alkali is soda or potash or both, although the invention is not necessarily confined to glasses of these particular characters.

This improved method consists in adding to a basic glass batch a certain proportion of lithia and fluorin-bearing minerals, such a amblygonite. For instance, to a soda glass batch, wherein the principal alkali is soda, I add a certain proportion of amblygonite or a similar mineral containing lithia and fluorin.

Amblygonite is a mineral largely found in South Dakota and other parts of the country and is of the nature of a lithium aluminum fluophosphate, the chemical formula for the same approximating Li(AlF)PO$_4$.

When amblygonite is added to batches for flint and other transparent glasses, the fluorin content also serves to agitate and mix the batch when the molten glass reaches a high temperature, especially in glasses made in tanks where this agitation or mixing is frequently desirable before the molten glass enters the refining end of the tank.

In some cases I may fuse the amblygonite separately or mix it with soda or lime and other chemicals and then bail out the fused material and afterward add it to the regular batch.

In practice, to a basic batch, for instance for making jars, bottles, window or plate glass or other inexpensive glass, I add from one to five per cent., more or less of amblygonite to the entire weight of the batch, which addition assists in fusing the glass and imparts strength to the same.

In other cases, such for instance as the making of opaque or translucent or special glasses, I add up to fifty per cent. of the amblygonite, but in all instances it is found that the addition of amblygonite to the batch very materially improves the strength, temper and appearance of the glass. The fluorin and phosphate contents in amblygonite assist to an important extent in imparting opacity or opaqueness to opal or opaque white and translucent glasses.

In the making of opal or opaque glasses it is essential that the glass batch fuse at a comparatively low temperature so that the acive agent, which causes the opaqueness, silicon fluorid, may be slowly and evenly generated and retained by the molten glass.

Amblygonite is particularly suited for the making of such glasses because it assists in fusing the batch at a low temperature and the high percentage of alumina contained causes it to produce glasses of superior mechanical quality such as clean cuts or fractures, when sheets thereof are cut for structural work, such as furniture tops and other articles.

The addition of amblygonite in suitable proportions to glass batches, primarily by reason of the lithia content, reduces the coefficient of expansion and thereby renders the finished glass more stable when subjected to high heat, that is, more resistant to heat.

When amblygonite is used in batches for opaque white or opal glass and for translucent glasses such as for lighting fixtures, the opaque or translucent properties of the glass remain more stable under melting conditions.

The fluorin content present in amblygonite reduces the amount of other materials containing fluorin ordinarily required in the manufacture of opaque white or opal glasses to a substantial extent. The life of the melting containers, such as tanks, pots, etc., is thereby lengthened.

The term "glass" as herein used is intended to cover any vitreous body, such as vitreous enamels and all classes of pottery glazes and such analogous materials, since enamels and glazes are forms of glass and are very effectively made by the addition of amblygonite thereto.

It is understood of course that I do not confine myself to the exact proportions herein specified as such proportions are given as examples of what has been found to be desirable ones in the manufacture of this improved glass.

In the making of jars, bottles, window or plate glass or other inexpensive glass or for the making of crystal or pressed glass where soda is the principal alkali, the batch to which the amblygonite is added usually consists of the well known materials, such as sand, soda and lime in the proportions well known in the art, and in the making of opaque or translucent or special glasses containing boracic acid, in which instance the batch is itself largely composed of amblygonite in the proportions hereinbefore referred to, the batch consists of sand and soda or potash or both with or without lime and usually fluorspar and feldspar, and therefore as these several batches from which glass is usually made are well known, a more detailed description thereof is unnecessary and therefore the term "batch" as used in the claims is intended to cover any of the mixtures of raw materials well known in the art.

The use of amblygonite not only materially toughens or strengthens the glass, but imparts thereto a soft gloss finish.

I claim as my invention:

1. The method of making glass, which consists in adding to an unfused batch of glass-making materials the mineral amblygonite, and then fusing the mixture.

2. The method of making glass, which consists in adding to an unfused batch of glass-making materials the mineral amblygonite in a fused condition, and then fusing the mixture.

3. The method of making glass, which consists in adding to an unfused batch of glass-making materials a portion not substantially exceeding fifty per cent. of lithia and fluorin-bearing minerals, and then fusing the mixture.

4. The method of making glass, which consists in adding to an unfused batch of glass-making materials a portion not substantially exceeding fifty per cent. of lithia and fluorin-bearing minerals in a fused condition, and then fusing the mixture.

5. The method of making glass, which consists in adding a quantity of amblygonite to a glass batch, and then fusing the batch thereby to produce a glass in which the strength, temper and appearance thereof is materially improved.

6. The method of making glass, which consists in adding up to fifty per cent. of amblygonite to a glass batch, and then fusing the batch.

7. The method of making inexpensive glass, which consists in adding to a glass batch from about one to five per cent. of amblygonite, and then fusing the batch.

8. The method of making glass, which consists in adding a quantity of amblygonite to a soda glass batch, and then fusing the batch.

9. The method of making opaque or translucent or specially formed glass or glass containing boracic acid, which consists in adding to a glass batch from one to fifty per cent. of amblygonite, and then fusing the batch.

10. The method of making glass, which consists in first fusing the amblygonite separately, and then afterward adding it to a batch of glass.

11. The method of making glass, which consists in first fusing amblygonite separately, and then adding to a batch of glass a quantity thereof not exceeding fifty per cent. of the weight of the batch of glass.

12. The method of making glass, which consists in fusing amblygonite with glass-producing materials, then bailing the fused glass, and then subsequently adding this fused material to a glass batch.

13. The method of making glass, which consists in first fusing amblygonite with a glass making material, and then adding the so fused material to a glass batch.

14. The method of making glass, which consists in first fusing amblygonite with an alkali material, then bailing out the fused material, and then adding the so fused material to a glass batch.

15. As an article of manufacture, glass containing fused amblygonite.

Signed at New York city, New York, this thirtieth day of September, 1918.

BERNARD F. DRAKENFELD, Jr.